United States Patent
Danziger et al.

(10) Patent No.: US 12,487,452 B2
(45) Date of Patent: Dec. 2, 2025

(54) COMPACT PROJECTOR FOR HEAD-MOUNTED DISPLAYS

(71) Applicant: Lumus Ltd., Ness Ziona (IL)

(72) Inventors: Yochay Danziger, Kfar Vradim (IL); Netanel Goldstein, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 927 days.

(21) Appl. No.: 17/760,840

(22) PCT Filed: Sep. 7, 2020

(86) PCT No.: PCT/IL2020/050974
§ 371 (c)(1),
(2) Date: Mar. 16, 2022

(87) PCT Pub. No.: WO2021/053661
PCT Pub. Date: Mar. 25, 2021

(65) Prior Publication Data
US 2022/0342216 A1 Oct. 27, 2022

Related U.S. Application Data

(60) Provisional application No. 63/061,513, filed on Aug. 5, 2020, provisional application No. 63/026,778, filed
(Continued)

(51) Int. Cl.
*G02B 27/01* (2006.01)
*G02B 26/10* (2006.01)
(Continued)

(52) U.S. Cl.
CPC ....... *G02B 27/0101* (2013.01); *G02B 26/105* (2013.01); *G02B 26/108* (2013.01);
(Continued)

(58) Field of Classification Search
None
See application file for complete search history.

(56) References Cited

U.S. PATENT DOCUMENTS

| | | |
|---|---|---|
| 2,748,659 A | 6/1956 | Geffcken et al. |
| 2,958,258 A | 11/1960 | Kelly |

(Continued)

FOREIGN PATENT DOCUMENTS

| | | |
|---|---|---|
| CN | 1606712 | 4/2005 |
| CN | 1795399 | 6/2006 |

(Continued)

OTHER PUBLICATIONS

International Commission on Non-Ionizing Radiation Protection "ICNIRP Guidelines for Limiting Exposure to Time-Varying Electric, Magnetic and Electromagnetic Fields (Up to 300 Ghz)" Published in: Health Physics 74 (4):494-522; 1998.

(Continued)

*Primary Examiner* — Bao-Luan Q Le
*Assistant Examiner* — Danell L Owens
(74) *Attorney, Agent, or Firm* — Rivka Friedman

(57) ABSTRACT

A compact projector for use in a head-mounted display device consists of an illumination section, a relay section, and a numerical aperture expander (NAE). The illumination section includes one or more illumination sources, a scanner, and a focusing lens which converges light onto an image plane. The NAE receives light from the illumination section, expands the average numerical aperture of the light, and transmits the light to the relay section. The relay section includes optical elements which collimate light from the image plane onto an exit pupil. The projector may also be fitted with lateral-axis and/or vertical-axis stops which prevent stray light from passing through the exit pupil.

19 Claims, 11 Drawing Sheets

Related U.S. Application Data on May 19, 2020, provisional application No. 62/900,673, filed on Sep. 16, 2019.

(51) Int. Cl.
*G02B 27/00* (2006.01)
*G03B 21/604* (2014.01)

(52) U.S. Cl.
CPC ....... *G02B 27/0081* (2013.01); *G03B 21/604* (2013.01); *G02B 2027/011* (2013.01)

(56) References Cited

U.S. PATENT DOCUMENTS

| | | |
|---|---|---|
| 3,626,394 A | 12/1971 | Nelson et al. |
| 3,667,621 A | 6/1972 | Barlow |
| 3,873,209 A | 3/1975 | Schinke et al. |
| 4,233,526 A | 11/1980 | Kurogi et al. |
| 4,240,738 A | 12/1980 | Praamsma |
| 4,331,387 A | 5/1982 | Wentz |
| 4,372,639 A | 2/1983 | Johnson |
| 4,383,740 A | 5/1983 | Bordovsky |
| 4,662,717 A | 5/1987 | Yamada et al. |
| 4,755,667 A | 7/1988 | Marsoner et al. |
| 4,775,217 A | 10/1988 | Ellis |
| 4,799,765 A | 1/1989 | Ferrer |
| 4,932,743 A | 6/1990 | Isobe et al. |
| 5,033,828 A | 7/1991 | Haruta |
| 5,208,800 A | 5/1993 | Isobe et al. |
| 5,235,589 A | 8/1993 | Yokomori et al. |
| 5,278,532 A | 1/1994 | Hegg et al. |
| 5,453,877 A | 9/1995 | Gerbe et al. |
| 5,481,385 A | 1/1996 | Zimmerman et al. |
| 5,499,138 A | 3/1996 | Iba |
| 5,537,260 A | 7/1996 | Williamson |
| 5,539,578 A | 7/1996 | Togino et al. |
| 5,555,329 A | 9/1996 | Kuper et al. |
| 5,594,830 A | 1/1997 | Winston et al. |
| 5,619,601 A | 4/1997 | Akashi et al. |
| 5,650,873 A | 7/1997 | Gal et al. |
| 5,680,209 A | 10/1997 | Meinrad |
| 5,708,449 A | 1/1998 | Heacock et al. |
| 5,712,694 A | 1/1998 | Taira et al. |
| 5,745,199 A | 4/1998 | Suzuki et al. |
| 5,751,480 A | 5/1998 | Kitagishi |
| 5,764,412 A | 6/1998 | Suzuki et al. |
| 5,808,709 A | 9/1998 | Davis |
| 5,808,800 A | 9/1998 | Handschy |
| 5,896,232 A | 4/1999 | Budd et al. |
| 6,007,225 A | 12/1999 | Ramer et al. |
| 6,021,239 A | 2/2000 | Minami et al. |
| 6,034,750 A | 3/2000 | Rai et al. |
| 6,222,676 B1 | 4/2001 | Togino et al. |
| 6,222,677 B1 | 4/2001 | Budd et al. |
| 6,222,971 B1 | 4/2001 | Veligdan et al. |
| 6,239,092 B1 | 5/2001 | Papasso et al. |
| 6,256,151 B1 | 7/2001 | Ma et al. |
| 6,266,108 B1 | 7/2001 | Bao |
| 6,307,612 B1 | 10/2001 | Smith |
| 6,324,330 B1 | 11/2001 | Stites |
| 6,362,861 B1 | 3/2002 | Hertz et al. |
| 6,400,493 B1 | 6/2002 | Mertz et al. |
| 6,404,550 B1 | 6/2002 | Yajima |
| 6,406,149 B2 | 6/2002 | Okuyama |
| 6,433,339 B1 | 8/2002 | Maeda et al. |
| 6,490,087 B1 | 12/2002 | Fulkerson et al. |
| 6,490,104 B1 | 12/2002 | Gleckman et al. |
| 6,671,100 B1 | 12/2003 | McRuer |
| 6,690,513 B2 | 2/2004 | Hulse et al. |
| 6,704,052 B1 | 3/2004 | Togino et al. |
| 6,704,065 B1 | 3/2004 | Sharp et al. |
| 6,799,859 B1 | 10/2004 | Ida et al. |
| 6,879,443 B2 | 4/2005 | Spitzer et al. |
| 6,880,931 B2 | 4/2005 | Moliton et al. |
| 6,894,821 B2 | 5/2005 | Kotchick |
| 7,025,464 B2 | 4/2006 | Beeson et al. |
| 7,163,291 B2 | 1/2007 | Cado et al. |
| 7,285,903 B2 | 10/2007 | Cull et al. |
| 7,405,881 B2 | 7/2008 | Shimizu et al. |
| 7,418,170 B2 | 8/2008 | Mukawa et al. |
| 7,448,170 B2 | 11/2008 | Milovan et al. |
| 7,554,737 B2 | 6/2009 | Knox et al. |
| 7,577,326 B2 | 8/2009 | Amitai |
| 7,710,655 B2 | 5/2010 | Freeman et al. |
| 7,778,508 B2 | 8/2010 | Hirayama |
| 7,995,275 B2 | 8/2011 | Maeda et al. |
| 8,035,872 B2 | 10/2011 | Ouchi |
| 8,187,481 B1 | 5/2012 | Hobbs |
| 8,520,310 B2 | 8/2013 | Shimizu |
| 8,655,178 B2 | 2/2014 | Capron et al. |
| 8,665,178 B1 | 3/2014 | Wang |
| 8,718,437 B2 | 5/2014 | Coe-Sullivan et al. |
| 8,783,893 B1 | 7/2014 | Seurin et al. |
| 8,786,519 B2 | 7/2014 | Blumenfeld et al. |
| 8,854,734 B2 | 10/2014 | Ingram |
| 8,873,148 B1 | 10/2014 | Gupta et al. |
| 8,913,865 B1 | 12/2014 | Bennett |
| 8,988,776 B2 | 3/2015 | Weber et al. |
| 9,488,840 B2 | 11/2016 | Mansharof et al. |
| 9,500,869 B2 | 11/2016 | Amitai |
| 9,513,481 B2 | 12/2016 | Levin et al. |
| 9,523,852 B1 | 12/2016 | Brown et al. |
| 9,541,762 B2 | 1/2017 | Mukawa et al. |
| 9,664,910 B2 | 5/2017 | Mansharof et al. |
| 9,766,459 B2 | 9/2017 | Alton et al. |
| 9,805,633 B2 | 10/2017 | Zheng |
| 10,088,633 B2 | 10/2018 | Mason |
| 10,222,535 B2 | 3/2019 | Remhof et al. |
| 10,302,957 B2 | 5/2019 | Sissom |
| 10,326,022 B2 | 6/2019 | Cheng et al. |
| 10,340,992 B2 | 7/2019 | Suzuki et al. |
| 10,564,430 B2 | 2/2020 | Amitai et al. |
| 10,571,699 B1 | 2/2020 | Parsons et al. |
| 10,768,432 B2 | 9/2020 | Amitai et al. |
| 11,428,926 B2 | 8/2022 | Suzuki et al. |
| 11,630,260 B2 | 4/2023 | Grabarnik et al. |
| 11,849,262 B2 | 12/2023 | Danziger |
| 2001/0000124 A1 | 4/2001 | Kollin et al. |
| 2001/0030860 A1 | 10/2001 | Kimura et al. |
| 2002/0008708 A1 | 1/2002 | Weiss et al. |
| 2002/0021498 A1 | 2/2002 | Ohtaka |
| 2002/0080615 A1 | 6/2002 | Marshall et al. |
| 2002/0080622 A1 | 6/2002 | Pashley et al. |
| 2002/0176173 A1 | 11/2002 | Song |
| 2002/0186179 A1 | 12/2002 | Knowles |
| 2003/0043364 A1 | 3/2003 | Jamieson et al. |
| 2003/0142276 A1 | 7/2003 | English, Jr. et al. |
| 2003/0169504 A1 | 9/2003 | Kaminsky et al. |
| 2004/0080718 A1 | 4/2004 | Kojima |
| 2004/0130797 A1 | 7/2004 | Leigh Travis |
| 2004/0145814 A1 | 7/2004 | Rogers |
| 2004/0263842 A1 | 12/2004 | Puppels et al. |
| 2004/0264185 A1 | 12/2004 | Grotsch et al. |
| 2005/0023545 A1 | 2/2005 | Camras et al. |
| 2005/0024849 A1 | 2/2005 | Parker et al. |
| 2005/0151939 A1 | 7/2005 | English, Jr. et al. |
| 2005/0173719 A1 | 8/2005 | Yonekubo et al. |
| 2005/0180687 A1 | 8/2005 | Amitai |
| 2006/0012842 A1 | 1/2006 | Abu-Ageel |
| 2006/0091784 A1 | 5/2006 | Conner et al. |
| 2006/0171046 A1 | 8/2006 | Recco et al. |
| 2006/0221448 A1 | 10/2006 | Nivon et al. |
| 2006/0228073 A1 | 10/2006 | Mukawa et al. |
| 2006/0268421 A1 | 11/2006 | Shimizu et al. |
| 2007/0003570 A1 | 1/2007 | Murtaugh et al. |
| 2007/0035706 A1 | 2/2007 | Margulis |
| 2007/0070859 A1 | 3/2007 | Hirayama et al. |
| 2007/0153344 A1 | 7/2007 | Lin |
| 2007/0165192 A1 | 7/2007 | Prior et al. |
| 2007/0284565 A1 | 12/2007 | Leatherdale et al. |
| 2007/0291491 A1 | 12/2007 | Li et al. |
| 2008/0019010 A1 | 1/2008 | Govorkov et al. |
| 2008/0030974 A1 | 2/2008 | Abu-Ageel |
| 2008/0062686 A1 | 3/2008 | Hoelen et al. |

(56) References Cited

U.S. PATENT DOCUMENTS

| | | |
|---|---|---|
| 2008/0068852 A1 | 3/2008 | Goihl |
| 2008/0151375 A1 | 6/2008 | Lin |
| 2008/0198604 A1 | 8/2008 | Kim et al. |
| 2008/0259429 A1 | 10/2008 | Kamm et al. |
| 2009/0161191 A1 | 6/2009 | Powell |
| 2009/0165017 A1 | 6/2009 | Syed et al. |
| 2009/0168134 A1 | 7/2009 | Nojima |
| 2009/0169134 A1 | 7/2009 | Hsu |
| 2009/0275157 A1 | 11/2009 | Winberg et al. |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0053148 A1 | 3/2010 | Khazeni et al. |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasyl Yev |
| 2010/0291489 A1 | 11/2010 | Moskovits et al. |
| 2011/0007243 A1 | 1/2011 | Tanaka |
| 2011/0013245 A1 | 1/2011 | Tanaka |
| 2011/0096566 A1 | 4/2011 | Tsai et al. |
| 2011/0176218 A1 | 7/2011 | Noui |
| 2011/0228511 A1 | 9/2011 | Weber |
| 2012/0069547 A1 | 3/2012 | Gielen et al. |
| 2012/0194781 A1 | 8/2012 | Agurok |
| 2012/0257282 A1* | 10/2012 | Hudman ............ G02B 27/0172 359/619 |
| 2012/0281389 A1 | 11/2012 | Panagotacos et al. |
| 2012/0287621 A1 | 11/2012 | Lee et al. |
| 2013/0016292 A1 | 1/2013 | Miao et al. |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0201690 A1 | 8/2013 | Vissenberg et al. |
| 2013/0208498 A1 | 8/2013 | Ouderkirk |
| 2013/0215361 A1 | 8/2013 | Wang |
| 2013/0334504 A1 | 12/2013 | Thompson et al. |
| 2014/0049610 A1 | 2/2014 | Hudman et al. |
| 2014/0104852 A1 | 4/2014 | Duong et al. |
| 2014/0192539 A1 | 7/2014 | Yriberri et al. |
| 2014/0226215 A1 | 8/2014 | Komatsu |
| 2014/0226361 A1 | 8/2014 | Vasylyev |
| 2014/0264420 A1 | 9/2014 | Edwards et al. |
| 2014/0293434 A1 | 10/2014 | Cheng |
| 2014/0334126 A1 | 11/2014 | Speier et al. |
| 2014/0334777 A1 | 11/2014 | Dubroca et al. |
| 2014/0374377 A1 | 12/2014 | Schulz |
| 2015/0009682 A1 | 1/2015 | Clough |
| 2015/0009687 A1 | 1/2015 | Lin |
| 2015/0049486 A1 | 2/2015 | Jung et al. |
| 2015/0098206 A1 | 4/2015 | Pickard et al. |
| 2015/0153569 A1 | 6/2015 | Yonekubo |
| 2015/0182348 A1 | 7/2015 | Siegal et al. |
| 2015/0247617 A1 | 9/2015 | Du et al. |
| 2016/0041387 A1 | 2/2016 | Valera et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0189432 A1 | 6/2016 | Bar-Zeev et al. |
| 2016/0209648 A1 | 7/2016 | Haddick et al. |
| 2016/0215956 A1 | 7/2016 | Smith et al. |
| 2016/0234485 A1 | 8/2016 | Robbins et al. |
| 2016/0266387 A1 | 9/2016 | TeKolste |
| 2016/0313567 A1 | 10/2016 | Kurashige |
| 2016/0327906 A1 | 11/2016 | Futterer |
| 2016/0341964 A1 | 11/2016 | Amitai |
| 2016/0370534 A1 | 12/2016 | Liu et al. |
| 2017/0003504 A1 | 1/2017 | Vallius |
| 2017/0017095 A1 | 1/2017 | Fricker et al. |
| 2017/0045666 A1 | 2/2017 | Vasylyev |
| 2017/0122725 A1 | 5/2017 | Yeoh |
| 2017/0176755 A1 | 6/2017 | Cai |
| 2017/0276947 A1 | 9/2017 | Yokoyama |
| 2017/0299860 A1* | 10/2017 | Wall .................. G02B 3/04 |
| 2017/0336636 A1 | 11/2017 | Amitai et al. |
| 2017/0357095 A1 | 12/2017 | Amitai |
| 2017/0357100 A1 | 12/2017 | Ouderkirk et al. |
| 2017/0363799 A1 | 12/2017 | Ofir |
| 2018/0039082 A1 | 2/2018 | Amitai |
| 2018/0067289 A1 | 3/2018 | Takahashi |
| 2018/0067315 A1 | 3/2018 | Amitai et al. |
| 2018/0097335 A1 | 4/2018 | Breidenassel |
| 2018/0157057 A1 | 6/2018 | Gelberg et al. |
| 2018/0267295 A1 | 9/2018 | Dalrymple et al. |
| 2018/0275396 A1 | 9/2018 | Schowengerdt et al. |
| 2018/0292599 A1 | 10/2018 | Ofir et al. |
| 2018/0292654 A1* | 10/2018 | Wall .................. H04N 9/315 |
| 2018/0307014 A1 | 10/2018 | Tanaka |
| 2018/0335629 A1 | 11/2018 | Cheng et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0086670 A1 | 3/2019 | Ishida |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278160 A1 | 9/2019 | Lin et al. |
| 2019/0346609 A1 | 11/2019 | Eisenfeld |
| 2019/0361240 A1 | 11/2019 | Gelberg |
| 2019/0377122 A1 | 12/2019 | Danziger |
| 2019/0391408 A1 | 12/2019 | Mansharof |
| 2020/0212835 A1 | 7/2020 | Fukuhara et al. |
| 2020/0225484 A1 | 7/2020 | Takagi et al. |
| 2020/0292818 A1 | 9/2020 | Amitai et al. |
| 2020/0292819 A1 | 9/2020 | Danziger et al. |
| 2021/0007255 A1 | 1/2021 | Hayakawa |
| 2021/0010935 A1 | 1/2021 | Poteet et al. |
| 2021/0063733 A1 | 3/2021 | Ronen |
| 2021/0080638 A1 | 3/2021 | Nichol et al. |
| 2021/0149199 A1 | 5/2021 | Guan et al. |
| 2021/0325662 A1 | 10/2021 | Schowengerdt et al. |
| 2022/0113549 A1 | 4/2022 | Danziger et al. |

FOREIGN PATENT DOCUMENTS

| | | |
|---|---|---|
| CN | 101542346 | 9/2009 |
| CN | 101846799 | 9/2010 |
| CN | 101846799 A | 9/2010 |
| CN | 107272185 | 10/2017 |
| CN | 106842778 | 5/2019 |
| DE | 10-2018 10296 | 8/2019 |
| EP | 0580952 | 2/1994 |
| FR | 2638242 | 4/1990 |
| GB | 1514977 | 6/1978 |
| GB | 2495398 | 4/2013 |
| JP | H06-164070 | 6/1994 |
| JP | H07-270711 | 10/1995 |
| JP | H10-123623 A | 5/1998 |
| JP | H10123623 | 5/1998 |
| JP | 2001066543 | 3/2001 |
| JP | 2001242412 | 9/2001 |
| JP | 2003140081 | 5/2003 |
| JP | 2004234027 A * | 8/2004 |
| JP | 2006145644 | 6/2006 |
| JP | 2006201637 | 8/2006 |
| JP | 2006201637 A | 8/2006 |
| JP | 2008107521 | 5/2008 |
| JP | 2008310342 | 12/2008 |
| JP | 2009021914 | 1/2009 |
| JP | 4394919 | 1/2010 |
| JP | 4394919 B | 1/2010 |
| JP | 2011227379 A | 11/2011 |
| JP | 2012123936 | 6/2012 |
| JP | 2012-163659 | 8/2012 |
| JP | 2016028275 | 2/2016 |
| KR | 101470387 | 12/2014 |
| TW | 201809798 | 3/2018 |
| WO | 9314393 | 7/1993 |
| WO | 2009066408 | 5/2009 |
| WO | 2011130720 | 10/2011 |

(56) References Cited

FOREIGN PATENT DOCUMENTS

| WO | 2012102328 | 8/2012 |
| --- | --- | --- |
| WO | 2013188464 | 12/2013 |
| WO | 2014076599 | 5/2014 |
| WO | 2014155096 | 10/2014 |
| WO | 2015081313 | 6/2015 |
| WO | 2016/017085 | 2/2016 |
| WO | 2016/181459 | 11/2016 |
| WO | 2017106873 | 6/2017 |
| WO | 2017125875 | 7/2017 |
| WO | 2018138714 | 8/2018 |

OTHER PUBLICATIONS

Jan van de Kraats et al. "Directional and nondirectional spectral reflection from the human fovea" journal of biomedical optics 13(2), 024010 Mar./Apr. 2008.

* cited by examiner

COMPACT PROJECTOR FOR HEAD-MOUNTED DISPLAYS

FIELD OF THE INVENTION

The present invention relates to displays, and in particular, to a compact projector for use in head-mounted displays and augmented reality systems.

BACKGROUND OF THE INVENTION

In a near-eye display or a head-up display, the function of a laser projector is to couple a scanned laser beam into a waveguide, which transmits the illumination into the eye of a viewer. Typically, the laser beam is scanned over an image field by scanning mirrors, and pupil imaging is used to maintain beam coupling into the waveguide.

In order to project an image into a near-eye, head-mounted display, the entrance pupil of the waveguide should:
 a) be fully illuminated so as to produce a uniform image, and
 b) be fully coupled to the waveguide even while scanning a projected field.

In the case of a laser projector, a laser beam is typically focused into a spot on an optical element that will be referred to as a Numerical Aperture Expander (hereinafter NAE), after which the light is collimated and directed to an exit pupil. The NAE may be implemented, for example, by a diffuser or a micro-lens array (MLA). After the NAE, the light is collimated and directed to an exit pupil. A scanner having one or more scanning mirrors is used to steer the laser beam over a projected field. The scanner typically forms the limiting optical aperture of the laser projector.

In color laser projectors, the light illumination from red, green, and blue lasers is typically combined into a single collimated beam which is scanned by a scanner and expanded by an NAE. The optical system of the projector and its associated mechanical supports are often bulky and difficult to implement in a head-mounted display.

The imaging performance of prior art laser projectors is primarily limited by spherical, chromatic, and/or field curvature optical aberrations. Spherical aberration occurs when forming a large projected field of view (FOV), because a laser focusing lens must focus rays over a large numerical aperture. Chromatic aberrations are introduced by differing ray paths for red, green, and blue laser illumination. Field curvature aberrations may be positive, as in the case of refractive optical elements, or negative, as in the case reflecting optical elements. The above aberrations severely limit the achievable image resolution of prior-art laser projectors.

SUMMARY OF THE INVENTION

The invention is an innovative compact projector which provides high image resolution by at least partially correcting the principal sources of optical aberration. The projector consists of an illumination section, an NAE, and a relay section. Some embodiments also include an optical stop placed in close proximity to an exit pupil of the relay section.

In this application, the term "laser" when used as a noun or an adjective is intended to include a variety of illumination sources used in head-mounted displays, such as laser diodes, light-emitting diodes (LED's), micro-LEDs, and liquid crystal on silicon (LCOS) illumination devices. Furthermore, the use of the term "plane" in optical terms, such as image plane, conjugate plane, and principal plane, is understood as referring to surfaces which may or may not be planar in a strictly mathematical sense.

According to one aspect of the presently disclosed subject matter, there is provided a compact projector for use in a head-mounted display device including: an illumination section, a relay section, and a numerical aperture expander (NAE); the illumination section having one or more illumination sources, a focusing lens which converges light onto an image plane, and a scanner placed between the focusing lens and the image plane; the relay section including optical elements which collimate light from the image plane onto an exit pupil; and the NAE configured to receive light from the illumination section, the received light having a first average numerical aperture, and to transmit light to the relay section, the transmitted light having a second average numerical aperture which is greater than the first by an NAE average expansion ratio which is greater than unity.

According to some aspects, the scanner is illuminated by a converging beam.

According to some aspects, the illumination section also includes a field lens placed between the scanner and the image plane, and proximal to the image plane.

According to some aspects, a beam diameter of light propagating from the scanner to the field lens diminishes by at least a factor of two.

According to some aspects, the scanner includes a single mirror, rotating about two substantially orthogonal axes, or two mirrors, each rotating about a single axis.

According to some aspects, the illumination sources include an illumination source selected from a group consisting of a laser diode, side-by-side laser diodes, a light-emitting diode (LED), a micro-LED, and a liquid crystal on silicon (LCOS) illumination device.

According to some aspects, the illumination section includes one or more photo-detectors for monitoring the illumination power emitted by one or more illumination sources.

According to some aspects, one or more photo-detectors include a spectral filter.

According to some aspects, the illumination section includes a reflecting lens.

According to some aspects, the projector includes at least two illumination sources arranged in a side-by-side configuration, where a first portion of light emitted by each of illumination sources is transmitted by the scanner and the focusing lens.

According to some aspects, a second portion of light emitted by each of the illumination sources is reflected towards a photo-detector array.

According to some aspects, the second portion of light is emitted along a fast axis of the illumination sources, which has a wide beam divergence.

According to some aspects, a spacing between the outer-most beams of the side-by-side configuration spans at least 0.1 millimeters.

According to some aspects, a surface of the NAE is curved in order to at least partially correct for field curvature aberration resulting from the relay section and/or the illumination section.

According to some aspects, the NAE is embedded between optical components with no inter-component gaps.

According to some aspects, the NAE is implemented as a micro-lens array (MLA) or an optical diffuser, which is at least partially transmitting or partially reflecting.

According to some aspects, the NAE is implemented as a diffused MLA, which includes a diffuser of relatively low optical power superimposed on the surface of an MLA of relatively high optical power.

According to some aspects, a value of the NAE average expansion ratio is in a range from two to five.

According to some aspects, the relay section includes a refractive collimating lens or a reflective collimating lens.

According to some aspects, the relay section includes one or more polarization optical elements.

According to some aspects, the relay section includes a polarizing beam splitter and a reflecting collimator lens.

According to some aspects, the focusing lens and the relay section are configured so that a scanning plane of the scanner is an image conjugate of the exit pupil.

According to another aspect of the presently disclosed subject matter, there is provided a compact projector for use in a head-mounted display device including a relay section optically coupled to a waveguide; the relay section having an exit pupil and the waveguide having an entrance pupil.

According to some aspects, a lateral-axis stop and/or a vertical-axis stop are placed at or in proximity to the exit pupil and/or the entrance pupil.

According to some aspects, the relay section includes a coupling prism optically connecting the exit pupil to the entrance pupil.

According to some aspects, one or more surfaces of the coupling prism include a lateral-axis stop and/or a vertical-axis stop.

According to another aspect of the presently disclosed subject matter, there is provided a compact projector for use in a head-mounted display device including: an illumination section, a relay section, and a numerical aperture expander (NAE); the illumination section including one or more illumination sources and a focusing lens which converges light onto an image plane; the relay section including optical elements which collimate light from the image plane onto an exit pupil; the NAE configured to receive light from the illumination section, the received light having a first average numerical aperture, and to transmit light to the relay section, the transmitted light having a second average numerical aperture which is greater than the first by an NAE average expansion ratio which is greater than unity; and the NAE including a curved surface whose curvature is configured to at least partially correct for field curvature aberration resulting from the relay section and/or the illumination section.

According to some aspects, a value of the NAE average expansion ratio is in a range from two to five.

According to another aspect of the presently disclosed subject matter, there is provided a compact projector for use in a head-mounted display device including: an illumination section, a relay section, and a numerical aperture expander (NAE); the illumination section including one or more illumination sources, a focusing lens which converges light onto an image plane, and a scanner placed between the focusing lens and the image plane, the scanner being illuminated by a converging beam; the relay section including optical elements which collimate light from the image plane onto an exit pupil; and the NAE configured to receive light from the illumination section, the received light having a first average numerical aperture, and to transmit light to the relay section, the transmitted light having a second average numerical aperture which is greater than the first by an NAE average expansion ratio which is greater than unity.

According to some aspects, the illumination section also includes a field lens placed between the scanner and the image plane, and in proximity to the image plane.

According to some aspects, a beam diameter of light propagating from the scanner to the field lens diminishes by at least a factor of two.

BRIEF DESCRIPTION OF THE DRAWINGS

The invention is herein described, by way of example only, with reference to the accompanying drawings Like reference numerals are used to denote similar or like elements to the drawings.

DESCRIPTION OF THE PREFERRED EMBODIMENTS

Figure 1:
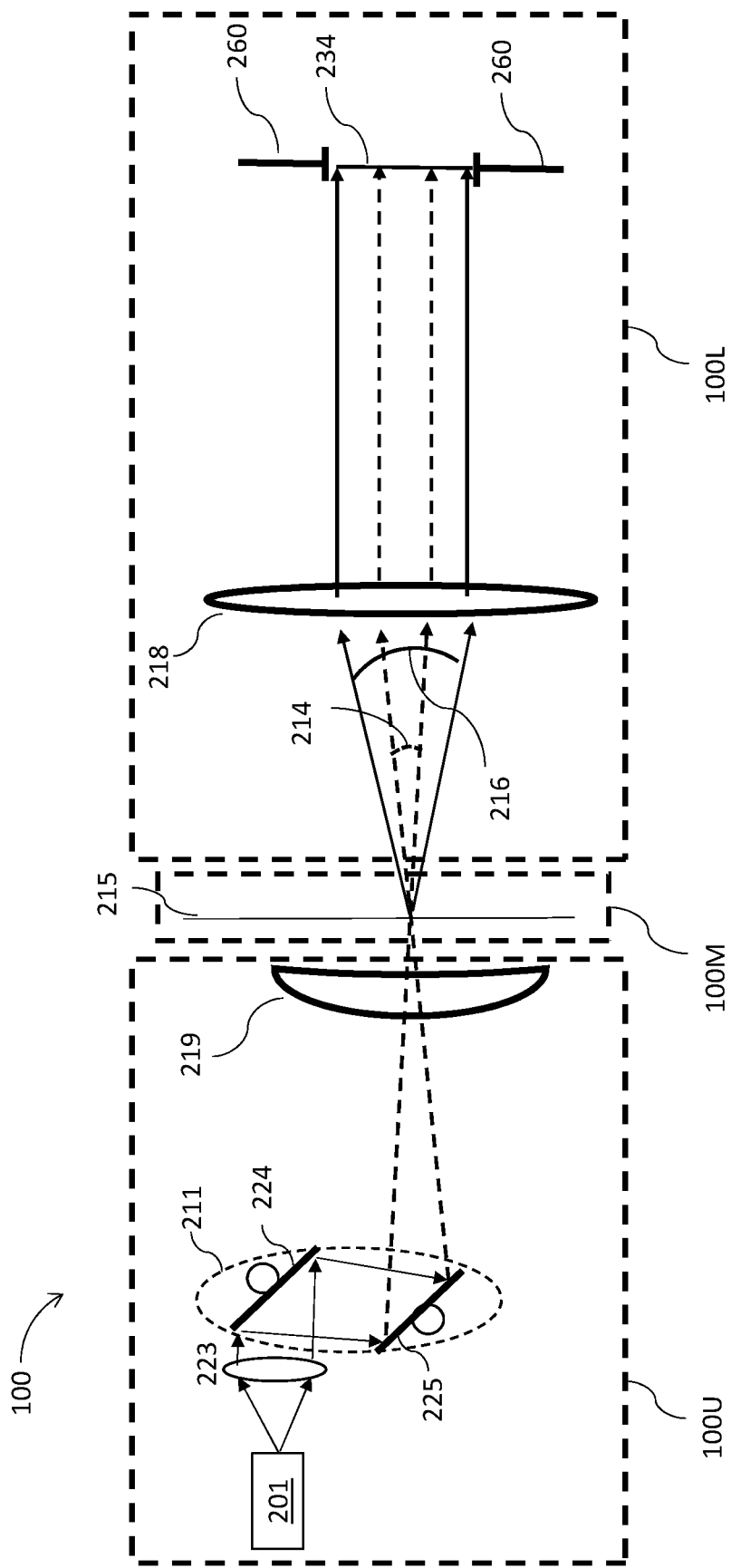
FIG. 1 is a schematic representation of the major optical components of a laser projector according to the principles of the present invention.

FIG. 1 shows a schematic representation of the major optical components of a compact projector 100 according to the principles of the present invention. The projector consists of three main sections: an illumination section 100U, an NAE 100M which contains one or more optical elements and a relay section 100L. The illumination section contains one or more illumination sources, which may be, for example, lasers or light-emitting diodes (LED's).

Light from laser 201 is focused onto image plane 215 by a focusing lens 223 which forms a converging beam. The converging beam is steered in two orthogonal directions by a scanner 211, which may consist, for example, of two scanning mirrors 224 and 225 as shown in FIG. 1, or of a single scanning mirror having two axes of rotation. Placing the scanner 211 in a converging beam avoids the need to place additional lenses after scanning mirror 225 and far from image plane 215. Such additional lenses, which are found in prior-art laser projectors, have the disadvantage of adding considerable weight and complexity.

The beam passing through field lens 219 is focused onto image plane 215, and then formed into a parallel beam by collimator lens 218. Field lens 219 is preferably proximal to image plane 215, so as to have negligible effect on focusing position and beam divergence and to enable pupil imaging between the scanner and pupil plane 234.

The rays entering image plane 215 have a relatively narrow numerical aperture denoted by 214. For example, the diameter of the converging beam in illumination section 100U may be 1.3 mm. at a principal plane of focusing lens 223, 0.8 mm. at mirror 224, and only 0.25 mm. at a principal plane of field lens 219. At image plane 215, the laser spot diameter is typically on the order of 0.01 mm., or 10 microns.

In the absence of NAE 100M which expands the numerical aperture, the light entering collimator lens 218 would form a narrow collimated beam, as shown by the dashed arrows in FIG. 1, and would not fill exit pupil 234. The result would be an incomplete image at the entrance pupil of a waveguide which couples light into the eye of a viewer. The effect of NAE 100M is to expand the numerical aperture, as shown by the solid arrows, and thereby to fill exit pupil 234. Any residual scattered light is absorbed by stop 260.

The NAE average expansion ratio, which is denoted by "R", has a value which is greater than or equal to unity. In general, the term "numerical aperture" denotes a semi-angle of a beam in a direction perpendicular to the axis of beam propagation. For beams that have a circular cross-sectional shape, a single value of numerical aperture in degrees is sufficient to characterize the angular width of the beam. For more general beams having a non-circular cross-sectional shape, an average value of numerical aperture may be computed by averaging over the solid angle of the beam. In this case, the term "NAE average expansion ratio" denotes a ratio in units of degree/degree between the average numerical aperture of the beam exiting the NAE and the average numerical aperture of the beam entering the NAE.

In FIG. 1, projector 100 has essentially two focusing mechanisms—one to focus the laser beam onto image plane 215, and one to collimate the beam entering exit pupil 234. Each of these focusing mechanisms contributes to field curvature.

Figure 2A:
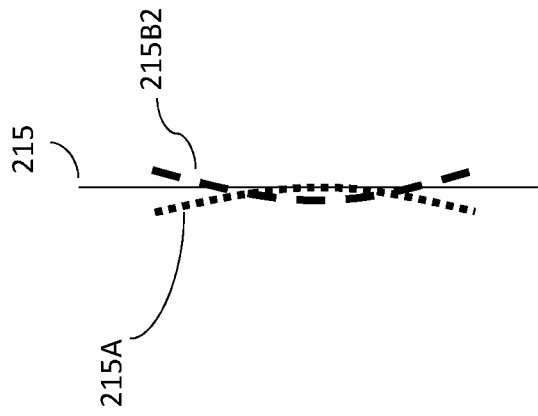
FIGS. 2A and 2B are illustrations of field curvature adjacent to the image plane in FIG. 1.
Figure 2B:
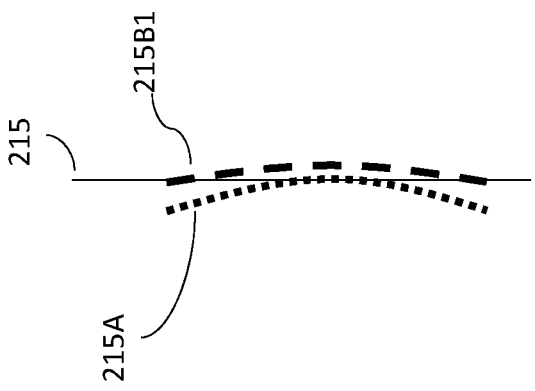

FIGS. 2(a) and 2(b) illustrate the field curvature adjacent to the image plane 215 assuming no field curvature correction by the NAE. The field curvature on the side facing the illumination section 100U is represented by a dotted line 215A. The field curvature on the side facing the relay section 100L has two possibilities, as illustrated by the dashed lines 215B1 and 215B2, in FIGS. 2(a) and 2(b), respectively. In FIG. 2(a), the curvatures of lines 215A and 215B1 have the same orientation; that is, both are concave when viewed from relay section 200L. By implementing a curved surface in NAE 100M in accordance with the curvature of lines 215 and 215B1, it is possible to at least partially correct the net field curvature and to optimize resolution of the projected image.

In FIG. 2(b), the curvatures of lines 215A and 215B2 are of opposite orientation. In this case, a curved surface in NAE 100M should be implemented primarily in accordance with the curvature orientation of line 215B2. This will be explained in further detail below, in connection with specific optical layouts for the relay section.

Figure 3:
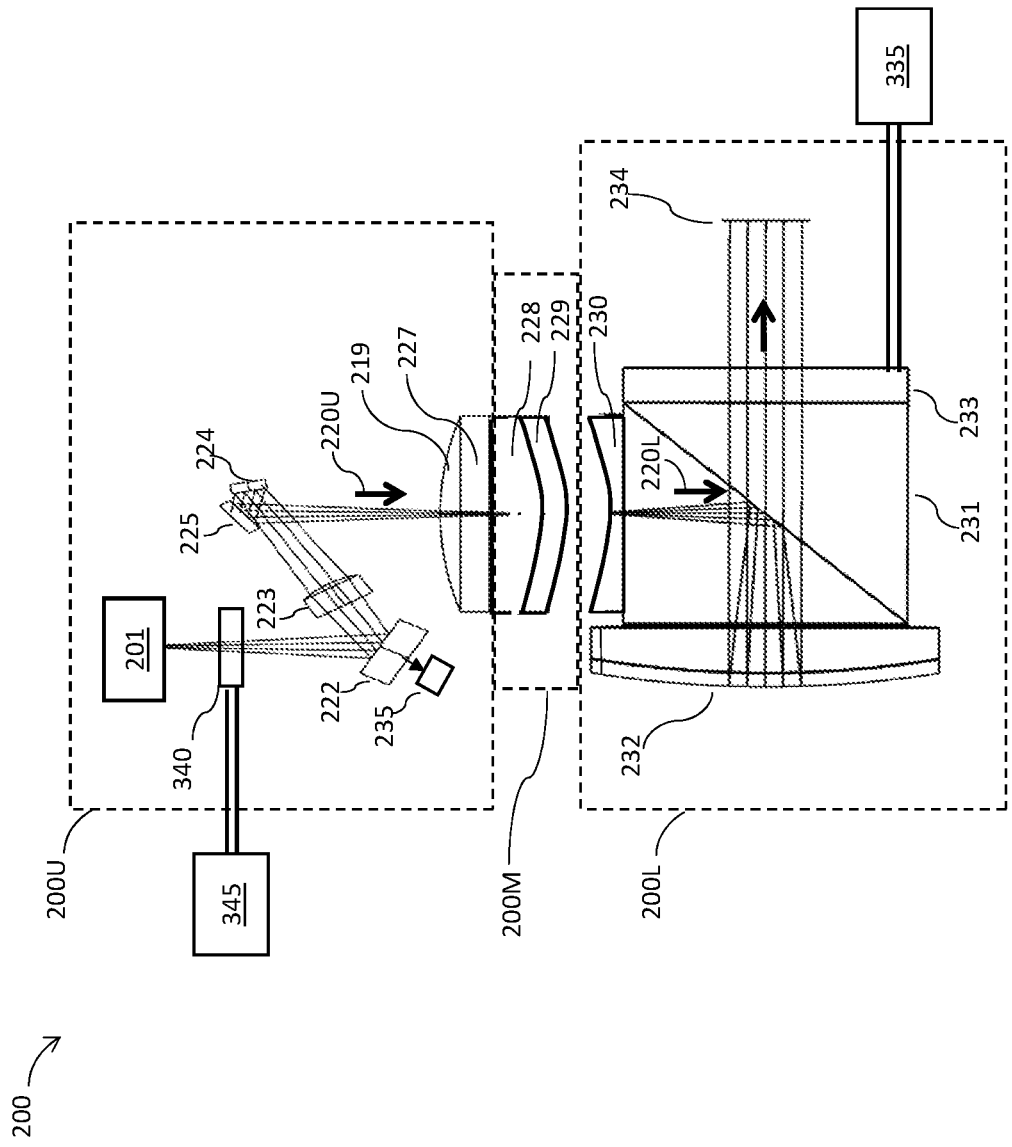
FIG. 3 is an exploded optical layout of an exemplary laser projector according to a first embodiment of the present invention.

FIG. 3 shows an optical layout of an exemplary laser projector 200 according to a first embodiment of the invention. Projector 200 consists of three sections: an illumination section 200U, an NAE 200M, and a relay section 200L. Light from laser 201 passes through a dynamic focusing device 340, such as a Corning® Varioptic® variable focus liquid lens made by Corning Inc., under the control of a focus actuator 345. The light is then reflected by folding mirror 222 and passes through focusing lens 223. Lens 223 is preferably a doublet or an aspherical lens. Scanning mirrors 224 and 225 direct the beam to field lens 219, which tilts the beam in order to generate a pupil imaging between a conjugate plane of the scanning mirror 224 or 225 and exit pupil 234. Optionally, mirror 222 may be partially transmissive, and a photo-detector 235 may be placed as shown in the figure to receive the light transmitted through mirror 222. Photo-detector 235 may be used to monitor various emission parameters of laser 201, such as the emitted illumination power level.

Laser focus spacer 227 is used to optimally focus the laser spot on image plane 215 during alignment of the illumination section 200U. The NAE 200M includes an NAE carrier 228 and an NAE substrate 229, which is in close proximity to image plane 215. The numerical aperture of the beams entering and exiting the NAE 200M are represented by arrows 220U and 220L, respectively. A collimator focus spacer 230 is used to optimize the collimation of light into exit pupil 234, during alignment of the relay section 200L. The space appearing between NAE substrate 229 and spacer 230 in the exploded optical layout of FIG. 3 is for the sake of clarity of exposition, and is not intended to be an inter-component gap. In fact, NAE substrate 229 and spacer 230 are preferably in contact, because an inter-component gap tends to complicate the mechanical construction and assembly of the projector, and may compromise structural integrity and sealing against humidity and particle contamination.

The light passing through collimator focus spacer 230 is reflected by polarization beam splitter (PBS) 231 onto a reflecting collimator lens 232. A collimated reflected beam passes through PBS 231 and polarization manipulator 233, to exit pupil 234. Polarization manipulator 233 is either a polarization scrambler or an active focus device controlled by a polarization actuator 335, such as a liquid crystal actuator. The use of polarization manipulator 233 is only possible if laser 201 has a well-defined polarization.

For the embodiment of FIG. 3, the field curvature at image plane 215 is similar to that shown in FIG. 2A, where the curvature of lines 215A and 215B1 have the same orientation. The curvature of line 215A in illumination section 200U is generated primarily by the focusing lens 223 and the scanning mirrors 224 and 225, which are illuminated by converging light. The curvature of line 215B1 in relay section 200L is generated primarily by the reflecting collimator lens 232. Because of the relatively large numerical aperture in the relay section, the latter contributes more field curvature defocusing than the illumination section, and must therefore must be more tightly compensated to prevent image degradation. In order to minimize laser spot size and to maximize image resolution in the projected image field, the physical curvature of NAE substrate 229 should be designed to be substantially the same as the curvature of line 215B1.

Figure 4:
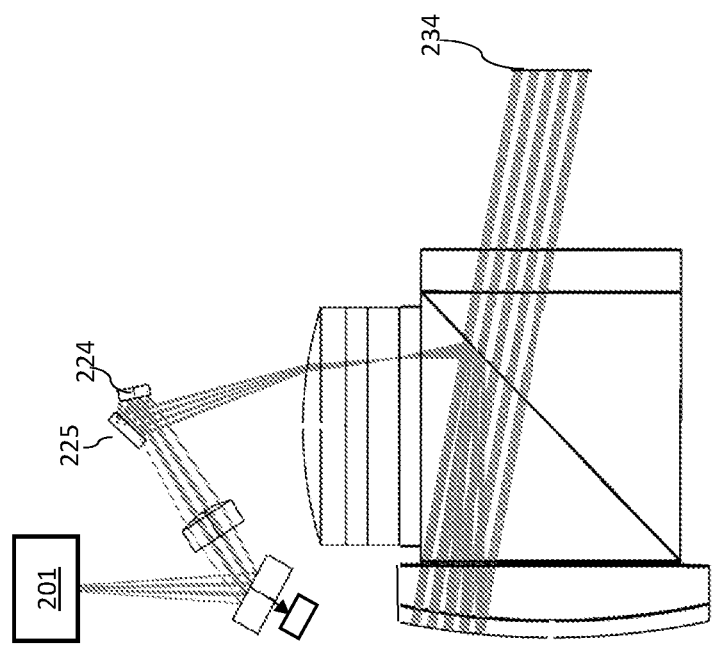
FIG. 4 is a ray tracing diagram for the embodiment of FIG. 3, in the case of scanning.

FIG. 4 is a ray tracing diagram for the embodiment of FIG. 3, in the case of scanning. Scanning mirror 225 is tilted in order to illuminate a different portion of a field of view (FOV) seen by a viewer. The optical power of the field lens 219 in the embodiment of FIG. 3 is determined so that a scanning plane of mirrors 224 or 225 is an image conjugate of the exit pupil 234. In this way, collimated light continues to pass through the exit pupil 234, even during off-axis scanning by the scanner.

Figure 5:
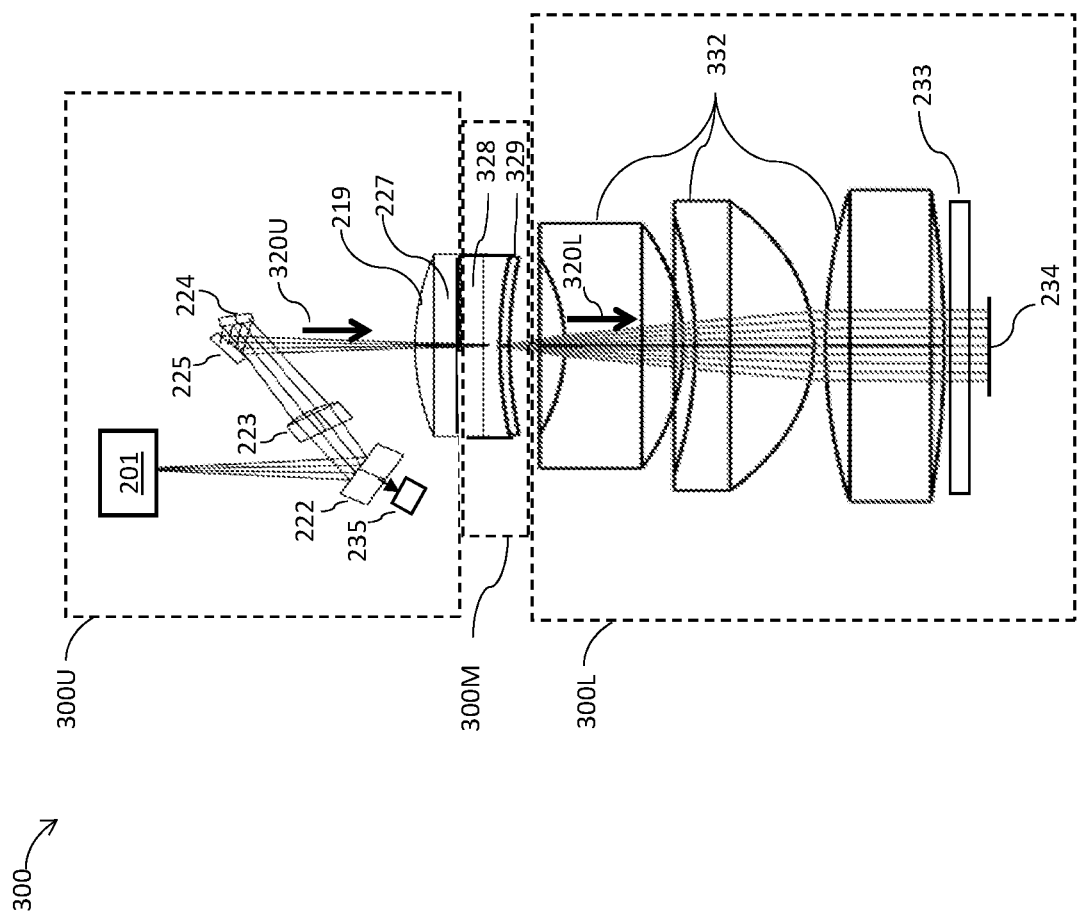
FIG. 5 is an exploded optical layout of an exemplary laser projector according to a second embodiment of the present invention.

FIG. 5 shows an optical layout of an exemplary laser projector 300 according to a second embodiment of the invention. Projector 300 consists of three sections: illumination section 300U, NAE 300M, and relay section 300L. As in FIG. 3, scanning mirrors 224 and 225 direct the beam to field lens 219, which tilts the beam in order to generate a pupil imaging between a conjugate plane of the scanning mirror 224 or 225 and exit pupil 234. The NAE 300M includes an NAE carrier 328 and an NAE substrate 329. The numerical aperture of the beams entering and exiting the NAE 300M are indicated by arrows 320U and 320L. Relay section 300L includes refractive elements 332. Collimated light passes through polarization manipulator 233 and exit pupil 234.

In order to optimize resolution across the imaging field of laser projector 300, the curvature of NAE substrate 329 is opposite in orientation to that of NAE substrate 229 in FIG. 3. The reason for this is a follows. For the embodiment of FIG. 5, the field curvature at image plane 215 is similar to that shown in FIG. 2B, where the curvature of lines 215A and 215B2 have opposite orientation. The field curvature of line 215B2 is introduced primarily by the refractive elements 332 in relay section 300L.

The numerical aperture in the relay section at arrow 320L is higher than that in the illumination section at arrow 320U. Since depth of field (DOF) is inversely proportion to numerical aperture, the DOF of the relay section is relatively small, typically on the order of 0.1 mm., as compared with the DOF of the illumination section, typically on the order of 0.5 mm. As a result, the curvature of NAE substrate 329 is governed primarily by the curvature of the relay section, whose orientation corresponds to that represented by line 215B2. The degree of curvature of NAE substrate 329 is determined so that the degree of defocusing due to field curvature is approximately the same on both sides of the NAE substrate. The optimal surface shape of NAE substrate 329 may be spherical in some implementations of laser projector 300 and aspherical in others.

Figure 6:
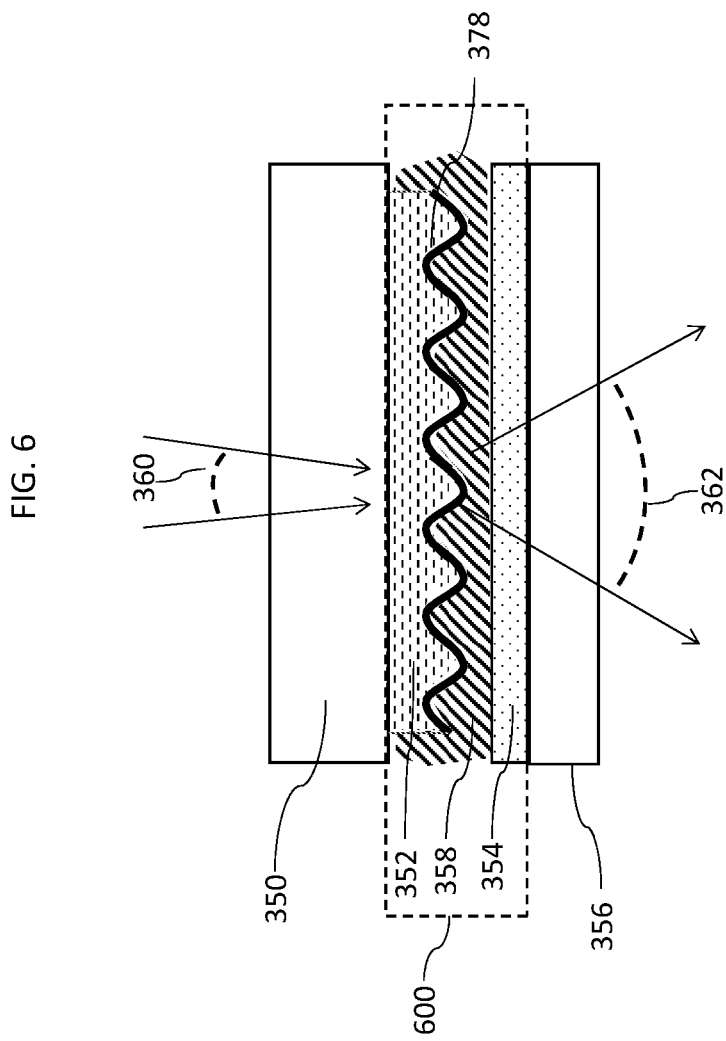
FIG. 6 is a diagram showing construction details of an embedded NAE according to the principles of the invention.

FIG. 6 is a diagram showing construction details of an embedded NAE 600 according to the principles of the invention. An embedded NAE is less affected by humidity and contamination, and is more mechanically robust, than prior-art NAE's having air gaps. Although the elements of NAE 600 are shown as having flat surfaces, the surfaces may also be curved, as, for example, in the case of NAE substrates 229 and 329, in FIGS. 3 and 5, respectively. Elements 350 and 356 represent spacers adjacent to NAE 600, which are analogous to the spacers 227 and 230 shown in FIG. 3.

The numerical apertures of light entering and leaving NAE 600 are indicated schematically by arrows 360 and 362, respectively. The value of the NAE average expansion ratio R is generally greater than one and typically in a range of 2 to 5. The NAE carrier 352 is adhered to NAE substrate 354 by application of an adhesive 358 to bonding surface 378. Denote the refractive index of the NAE carrier by n(352) and that of the adhesive by n(358). If the adhesive were to be replaced by an inter-component gap having a refractive index equal to one, as in prior-art NAE' s, the value of R would be reduced by a factor equal to [n(358)−n(352)]/[n(352)−1]. Thus, the introduction of an inter-component gap would reduce the NAE average expansion ratio, R.

Figure 7B:
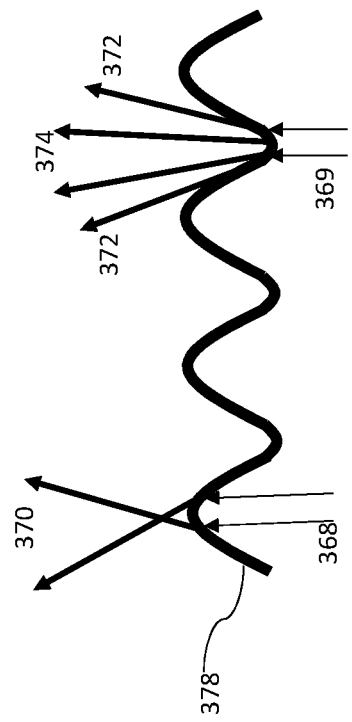
FIG. 7B is a diagram of an embedded NAE surface according to the present invention.
Figure 7A:
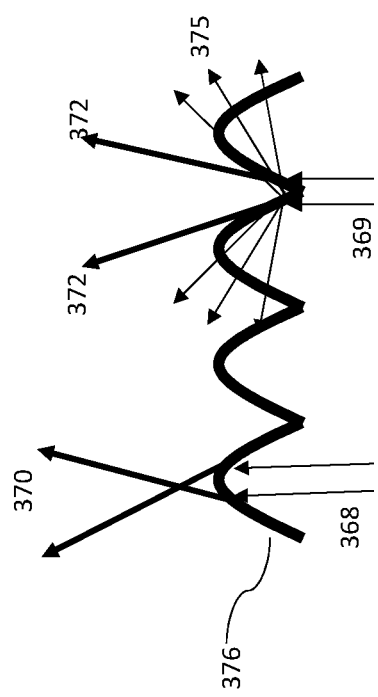
FIG. 7A is a diagram of an NAE surface according to the prior art.

FIG. 7A is a diagram of an NAE surface 376 according to the prior art, where the surface may correspond to that of a diffuser or a micro-lens array (MLA). Incident rays 368 from a scanning laser impinge on surface 376 at an area which is smooth, and the scattering causes an increase in numerical aperture as represented by rays 370. However, incident rays 369 impinge on surface 376 at a sharply pointed area between adjacent diffusers or micro-lenses. In this case, in addition to the normal scattered rays 372, the scattering also produces rays 375 which are diffracted at wide angles. These rays give rise to multiple scattering and degrade the image contrast in some pixels of the projected image.

FIG. 7B is a diagram of an embedded NAE surface 378 according to the present invention. Surface 378 has no sharply pointed areas. Incident ray 369 in this case produces rays 372 and 378, which all contribute to the desired increase in numerical aperture on leaving the NAE. There are no rays diffracted at wide angles, as in the prior-art of FIG. 7A. As a result, the embedded NAE of the invention does not suffer the image contrast degradation exhibited by prior art diffusers or MLAs.

When NAE surface 378 is implemented as an MLA, the full-width half-maximum diameter of the illumination spot on the MLA preferably should be one to four times larger than the pitch between adjacent micro-lenses, in order to avoid diffraction effects.

The light transmitted through the NAE of FIG. 7B may produce illumination of non-uniform intensity. To correct for non-uniformity, the NAE may be implemented with a "diffused MLA", in which a diffuser is superimposed on the generally curved surface of an MLA. The optical power of the diffuser is preferably small as compared to that of the MLA. For example, the numerical aperture expansion provided by the diffuser may be only one-fifth to one-third of that of the MLA. In a diffused MLA constructed according to the principles of the invention disclosed above, the non-uniformities of the MLA are effectively averaged out, while those of the diffuser are insignificant.

Figure 8C:
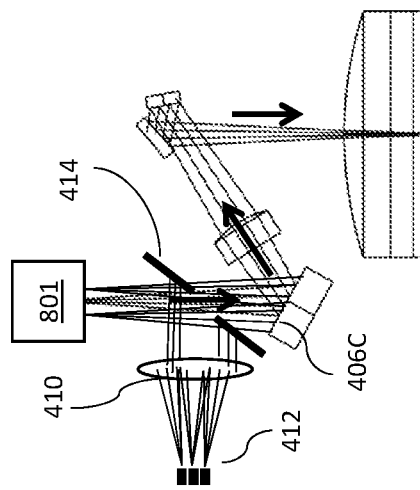
FIGS. 8A, 8B, and 8C are schematic optical layouts of exemplary illumination sections for a laser projector having multiple laser beams, according to the present invention.
Figure 8B:
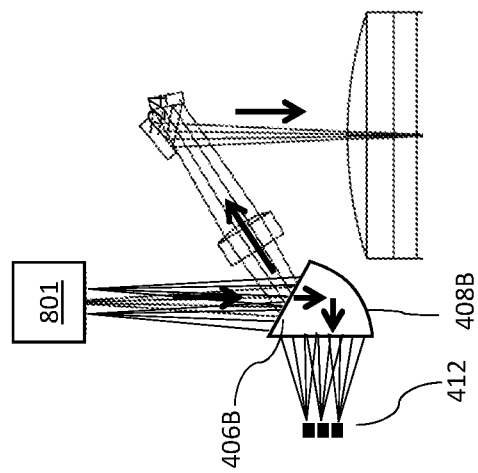
Figure 8A:
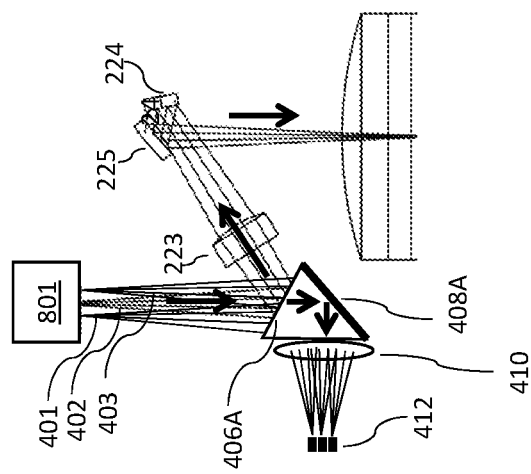

FIGS. 8A, 8B, and 8C show schematic optical layouts of exemplary illumination sections for a laser projector having multiple laser beams, according to the present invention. Laser module 801 emits beams 401, 402, and 403, having wavelengths, for example, corresponding to red, green, and blue illumination. Typically, the beams are emitted by three adjacent laser sources, arranged in a side-by-side configuration inside laser module 801. The outermost laser beams are typically separated by 0.1 mm. or more. The lasers are aligned so that their beams all pass through the focusing lens 223, and illuminate the scanning mirrors 224 and 225. Real-time monitoring of the laser module 801 by a photo-detector array 412 is essential in order to prevent power spiking and to maintain tight control over the illumination power level and stability of each emitted beam.

In FIG. 8A, the beams 401, 402, and 403 are partially reflected by partially reflecting surface 406A. A portion of the light in each beam is transmitted through surface 406A and then reflected by a surface 408A and focused by a lens 410 onto the photo-detector array 412. Lens 410 images a source plane of the multiple lasers in laser module 801 onto the photo-detector array 412, so that each photo-detector in array 412 receives the light power corresponding to a single laser. In order to reduce optical crosstalk between the photo-detectors it is preferable to apply one or more spectral filters to array 412, so that different parts of the photo-detector array are sensitive to different laser wavelengths.

In FIG. 8B, a curved reflecting surface 408B combines the two functions of reflection and focusing in a single element, which replaces the surface 408A and lens 410 of FIG. 8A.

Laser beams, such as those emitted by laser diodes, typically are characterized by a "fast" axis, in which the beam divergence angle is relatively broad and a "slow" axis, in which the beam divergence angle is relatively narrow. FIG. 8C shows a schematic optical layout in which the light rays used for monitoring laser power are those emitted on the fast axis at large angles, which do not impinge on scanning mirrors 224 and 225.

In FIG. 8C, a reflecting mirror 414 having a center hole, or aperture, is positioned so that the light used for imaging passes through the center hole and is reflected by a totally (100%) reflecting mirror 406C, towards the scanning mirrors. The light emitted on the fast axis at large angles is reflected by mirror 414 and then focused by lens 410 onto the photo-detector array 412. Other shapes of mirror 414 are possible including collecting light only from one side of the diverging illumination beams.

The schematic optical layouts shown in FIGS. 8A, 8B, and 8C are exemplary, and many alternative configurations are possible. For example, the reflecting elements 406A, 406B and 406C, which act as folding reflectors, are shown as being in the plane of the drawing. However, more compact and light efficient configurations may often be achieved by placing the reflecting elements outside the plane of the figures. Furthermore, array 412 and lens 410 may be placed directly behind reflector 222C in FIG. 3, thereby eliminating the need for reflecting mirror 408.

Figure 9B:
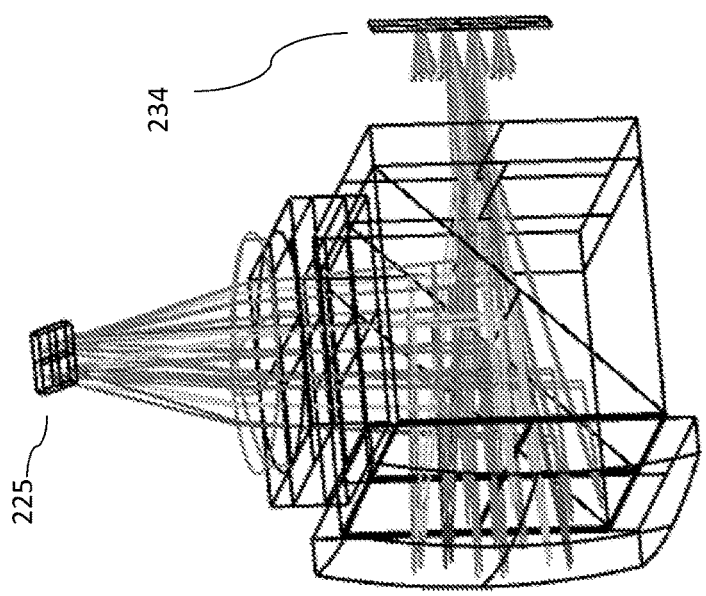
FIG. 9B is a perspective view of portions of a laser projector showing an exemplary rotation of a scanning mirror.
Figure 9A:
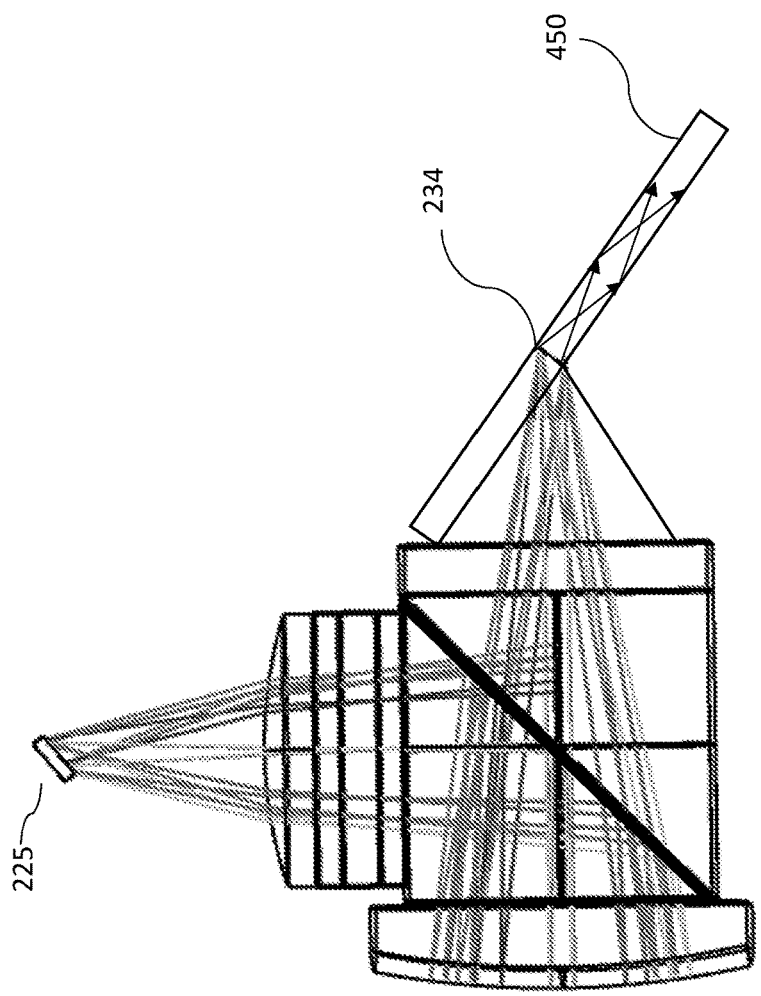
FIG. 9A is a side view of portions of a laser projector and an associated waveguide, according to the invention.

FIG. 9A is a side view of portions of a laser projector and an associated waveguide, according to the invention. Insofar as the scanning mirrors 224 and 225 are often the smallest apertures in the projector system, optimal light transmission is achieved when a scanning plane of the scanner is an image conjugate of the exit pupil 234. The exit pupil also serves as the entrance pupil of a waveguide 450, as shown in FIG. 9A. The size and shape of the optical components in the laser projector are determined so that exit pupil 234 fully overlaps with the entrance pupil of waveguide 450.

FIG. 9B is a perspective view of portions of a laser projector showing an exemplary rotation of a scanning mirror. In FIG. 9B, scanning mirror 225 is tilted at a 90 degree angle with respect to the incident laser light and to other components of the laser projector. Exit pupil 234 is also rotated, so that a scanning plane of mirror 225 continues to be an image conjugate of the exit pupil.

Figure 10B:
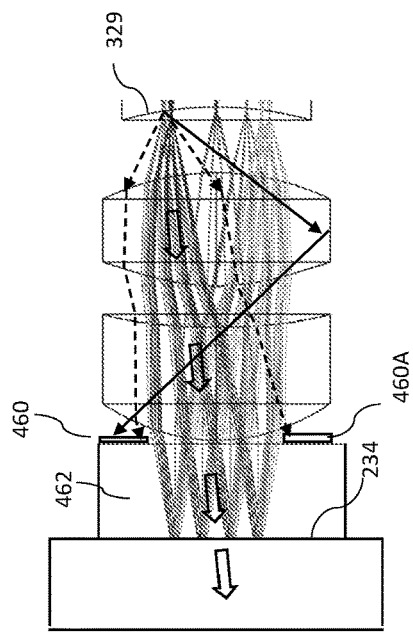
FIGS. 10A, 10B, and 10C are diagrams showing exemplary implementations of a vertical-axis stop and a lateral-axis stop, which are configured to prevent stray light from passing through an exit pupil of the projector.
Figure 10C:
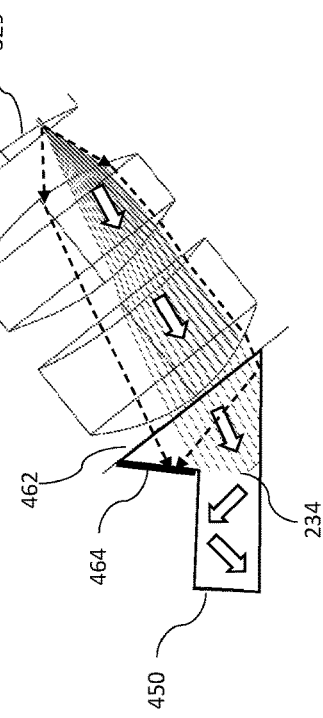
Figure 10A:
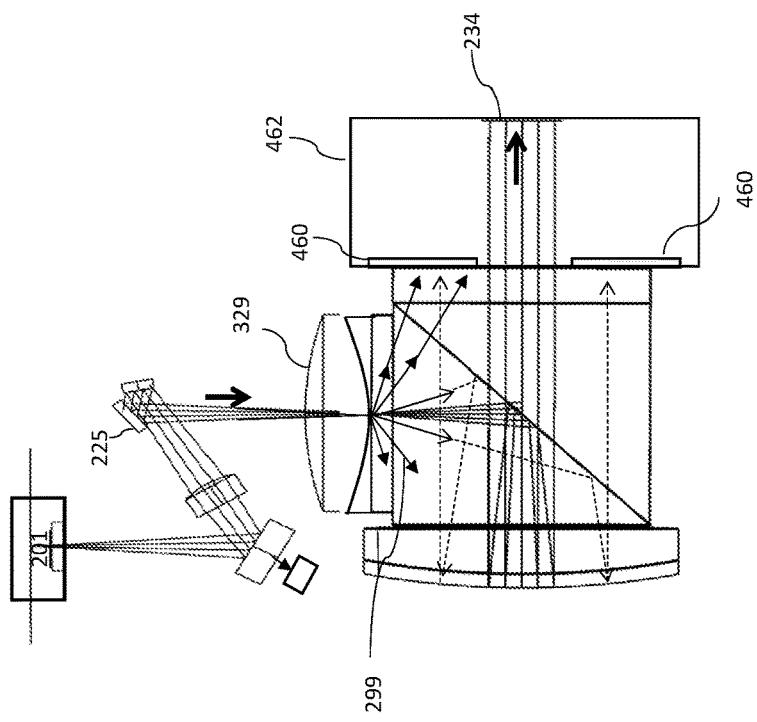

FIGS. 10A, 10B, and 10C are diagrams showing exemplary implementations of a vertical-axis stop and a lateral-axis stop, which are configured to prevent stray light from passing through an exit pupil of the projector, where it may produce image distortion and contrast degradation. The optical stop consists of a vertical-axis stop 464 and a lateral-axis stop 460, where the vertical axis points in the direction of the waveguide thickness, as shown in FIG. 9A, and the lateral axis points in a direction perpendicular to the vertical axis and to the direction of propagation of the light inside the waveguide.

In FIG. 10A, stray light may be generated by wide angle scattering in the NAE, as represented by the arrows 299. FIG. 10B is a top view, showing the lateral-axis stop 460, attached to a surface of a coupling prism 462. FIG. 10C is a side view, showing the vertical-axis stop 464, attached to a different surface of coupling prism 462.

In FIGS. 10A-10C, the stops 460 and 464 are displaced somewhat from the position of exit pupil 234. This displacement is not desirable, as it may allow some scattered light to pass through the exit pupil 234 and to enter the waveguide 450.

FIGS. 11A-11D are diagrams showing exemplary stop configurations according to the invention, in which the stops are placed in close proximity to the exit pupil 234. Various stop components are denoted by 460A, 460B, 460C, and 460D.

Figure 11A:
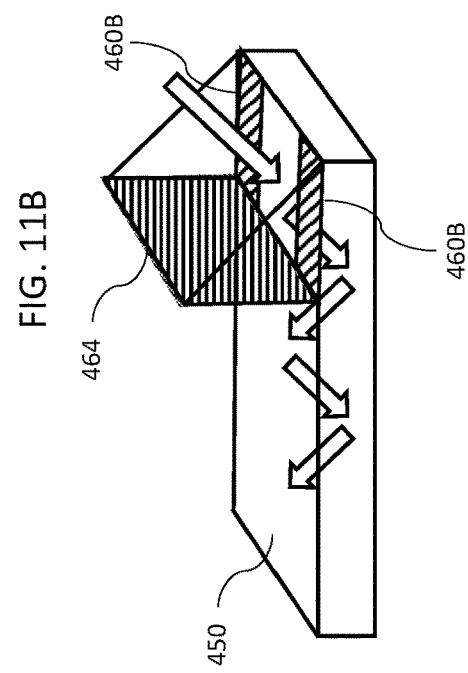
FIGS. 11A-11D are diagrams showing exemplary stop configurations, according to the invention.
Figure 11B:
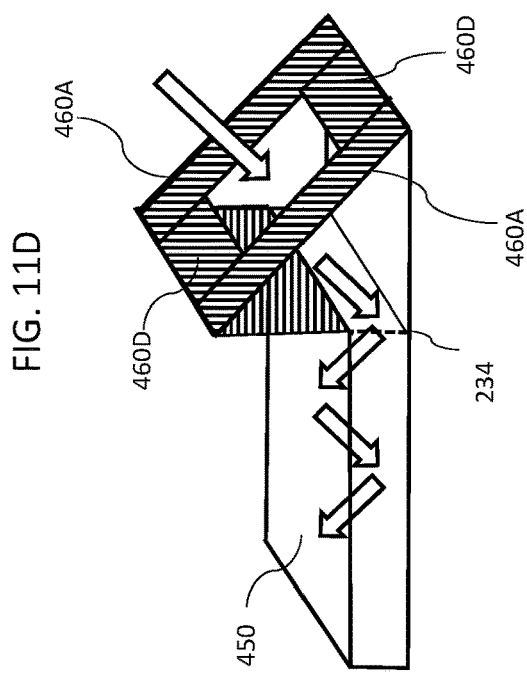
Figure 11C:
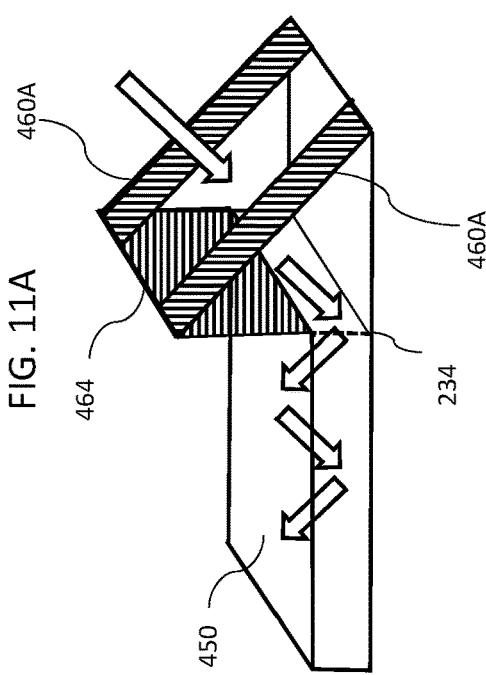

In FIGS. 11A, C, and D, a coupling prism is placed beside waveguide 450. In FIG. 11C, the lateral-axis component 460C is on the interface between the coupling prism and the waveguide 450. This has the advantage of enabling the vertical-axis stop 464 to be very close to the exit pupil. In FIG. 11B, the coupling prism is placed on top of waveguide 450. This has the advantage of enabling component 460B of the lateral-axis stop to be very close to the exit pupil.

Figure 11D:
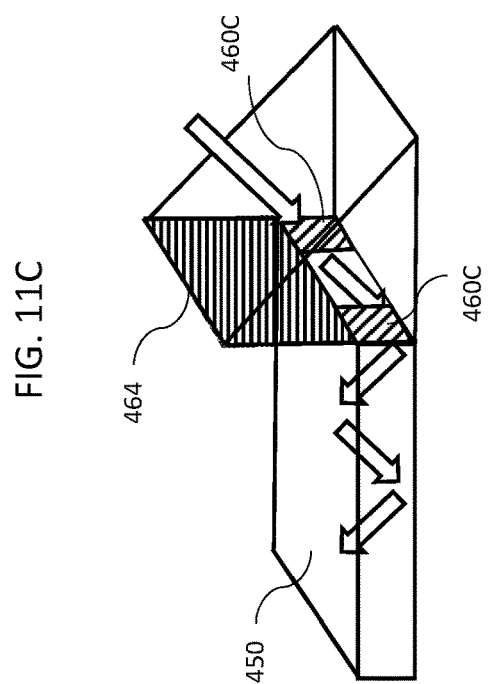

In FIG. 11D, an additional vertical-axis stop component 460D is introduced to block stray light that does not originate from the NAE. Stop component 460D is generally wider than exit pupil 234, and may be implemented in combination with the stop component 460B.

The configurations in FIGS. 11A, 11B, and 11C are especially suited to embodiments of the laser projector, in which the scanning mirrors are substantially separated and are small relative to the apertures of other optical element in the projector.

It will be appreciated that the above descriptions are intended only to serve as examples, and that many other embodiments are possible within the scope of the present invention as defined in the appended claims. For example, the illumination sources in the illumination section of the projector may be lasers, light emitting diodes (LED's) micro-LED's, and/or liquid crystal on silicon (LCOS) illumination devices. As another example, the coupling prism between the relay section and a waveguide may operate in a reflection mode, instead of a transmission mode. Furthermore, many other configurations of the NAE are possible, besides those shown explicitly in FIG. 6 and FIG. 7B, based upon the principles disclosed herein, as will be readily apparent to those skilled in the art of optical design.

The invention claimed is:

1. A projector for use in a display device, the projector comprising an illumination section, a relay section, and a numerical aperture expander (NAE),
    the illumination section comprising one or more illumination sources, a focusing lens which converges light onto an image plane, and a scanner comprising a scanning plane;
    the relay section comprising optical elements which collimate light from the image plane onto an exit pupil, the relay section configured so that the scanning plane is an image conjugate of the exit pupil; and
    the NAE configured to receive light from the illumination section, the received light having a first average numerical aperture, and to transmit light to the relay section, the transmitted light having a second average numerical aperture which is greater than the first by an NAE average expansion ratio which is in a range from two to five.

2. The projector of claim 1 wherein the one or more illumination sources comprises an illumination source selected from a group comprising a laser diode, side-by-side laser diodes, a light-emitting diode (LED), a micro-LED, and a liquid crystal on silicon (LCOS) illumination device.

3. The projector of claim 1 wherein the illumination section comprises a reflecting lens.

4. The projector of claim 1 comprising at least two illumination sources arranged in a side-by-side configuration, wherein a first portion of light emitted by each of illumination sources is transmitted by the scanner and the focusing lens.

5. The projector of claim 4 wherein a second portion of light is emitted along a fast axis of the illumination sources, said fast axis having a wide beam divergence.

6. The projector of claim 5 wherein a spacing between outermost beams of the side-by-side configuration spans at least 0.1 millimeters.

7. The projector of claim 1 wherein a surface of the NAE is curved in order to at least partially correct for field curvature aberration, resulting from at least one of the relay section and the illumination section.

8. The projector of claim 7 wherein the NAE is implemented as a micro-lens array (MLA) or an optical diffuser which is at least partially transmitting or partially reflecting.

9. The projector of claim 7 wherein the relay section comprises at least one of a polarizing beam splitter, a refractive collimating lens, a reflective collimating lens, and a coupling prism.

10. The projector of claim 7 further comprising a waveguide having an entrance pupil which overlaps the exit pupil.

11. The projector of claim 7 comprising at least two illumination sources arranged in a side-by-side configuration, wherein a first portion of light emitted by each of illumination sources is transmitted by the scanner and the focusing lens.

12. The projector of claim 1 wherein the NAE is embedded between optical components with no inter-component gaps.

13. The projector of claim 1 wherein the NAE is implemented as a micro-lens array (MLA) or an optical diffuser, which is at least partially transmitting or partially reflecting.

14. The projector of claim 1 wherein the NAE is implemented as a diffused MLA, which comprises a diffuser of relatively low optical power superimposed on the surface of an MLA of relatively high optical power.

15. The projector of claim 1 wherein the relay section comprises at least one of a polarizing beam splitter, a refractive collimating lens, a reflective collimating lens, and a coupling prism.

16. The projector of claim 1 comprising a waveguide having an entrance pupil which overlaps the exit pupil.

17. The projector of claim 1 wherein the illumination section further comprises a field lens interposed between the scanner and the image plane and a beam diameter of light propagating from the scanner to the field lens diminishes by at least a factor of two.

18. A projector for use in a display device, the projector comprising an illumination section, a relay section, and a numerical aperture expander (NAE),
the illumination section comprising one or more illumination sources, a focusing lens which converges light onto an image plane, and a scanner comprising a scanning plane;
the relay section comprising optical elements which collimate light from the image plane onto an exit pupil, the relay section configured so that the scanning plane is an image conjugate of the exit pupil; and
the NAE configured to receive light from the illumination section, the received light having a first average numerical aperture, and to transmit light to the relay section, the transmitted light having a second average numerical aperture which is greater than the first by an NAE average expansion ratio which is greater than unity,
further comprising a waveguide having an entrance pupil which overlaps the exit pupil, and wherein a lateral-axis stop and/or a vertical-axis stop are positioned at or proximal to the exit pupil and/or the entrance pupil.

19. A projector for use in a display device, the projector comprising an illumination section, a relay section, and a numerical aperture expander (NAE),
the illumination section comprising one or more illumination sources, a focusing lens which converges light onto an image plane, and a scanner comprising a scanning plane;
the relay section comprising optical elements which collimate light from the image plane onto an exit pupil, the relay section configured so that the scanning plane is an image conjugate of the exit pupil; and
the NAE configured to receive light from the illumination section, the received light having a first average numerical aperture, and to transmit light to the relay section, the transmitted light having a second average numerical aperture which is greater than the first by an NAE average expansion ratio which is greater than unity,
and further comprising a coupling prism having a lateral-axis stop and/or a vertical-axis stop on one or more surface of the prism.

* * * * *